(12) United States Patent
Seol et al.

(10) Patent No.: US 7,055,799 B2
(45) Date of Patent: Jun. 6, 2006

(54) ELECTROMAGNETIC APPARATUS FOR AUTOMATICALLY AND SELECTIVELY SUPPLYING AND SHUTTING OFF FLUID

(75) Inventors: Jin-Soo Seol, Cheongju-si (KR); Hee-Seung Kim, Seoul (KR)

(73) Assignee: Jahwa Electronics Co., LTD (KR)

( * ) Notice: Subject to any disclaimer, the term of this patent is extended or adjusted under 35 U.S.C. 154(b) by 34 days.

(21) Appl. No.: 10/758,803

(22) Filed: Jan. 16, 2004

(65) Prior Publication Data
US 2004/0144940 A1    Jul. 29, 2004

(30) Foreign Application Priority Data
Jan. 21, 2003    (KR)    ............... 10-2003-0004082

(51) Int. Cl.
*F16K 31/02*    (2006.01)
(52) U.S. Cl. ............... 251/129.11; 251/129.1
(58) Field of Classification Search ...............
251/129.09–129.11, 129.16
See application file for complete search history.

(56) References Cited

U.S. PATENT DOCUMENTS

| | | | | |
|---|---|---|---|---|
| 5,944,299 A | * | 8/1999 | Toyama | ............ 251/129.2 |
| 6,125,885 A | * | 10/2000 | Hirata et al. | ............ 137/625.43 |
| 6,325,055 B1 | * | 12/2001 | Yokoyama et al. | ... 123/568.24 |

* cited by examiner

*Primary Examiner*—J. Casimer Jacyna
(74) *Attorney, Agent, or Firm*—Galgano & Burke, LLP

(57) ABSTRACT

Disclosed herein is an electromagnetic apparatus for automatically and selectively supplying and shutting off fluid. The electromagnetic apparatus includes a frame unit, a through unit, a coil unit, a rotor, a casing, a shaft and a casing. The frame unit is coaxially contained in the piping or a housing forming the flow path of a fluid. The through unit has one or more through holes to form one or more flow paths through the frame unit. The coil unit is placed in the frame unit to generate an electromagnetic force. The rotor is placed to face the frame unit to selectively open and close the flow paths through interaction with the electromagnetic force generated in the coil unit. The shaft supports the rotor, and a casing supports the frame unit and forms the appearance of the apparatus.

20 Claims, 4 Drawing Sheets

ELECTROMAGNETIC APPARATUS FOR AUTOMATICALLY AND SELECTIVELY SUPPLYING AND SHUTTING OFF FLUID

BACKGROUND OF THE INVENTION

1. Field of the Invention

The present invention relates generally to an electromagnetic apparatus for automatically and selectively supplying and shutting off fluid, which is installed in a pipe or housing supplying gas or liquid to selectively supply and shut off gas or liquid when a signal is applied from the outside of the apparatus. In particular, the present invention relates to an electromagnetic apparatus for automatically and selectively supplying and shutting off fluid, in which a frame unit is installed in the piping or a housing supplying fluid to be in direct contact with the fluid, the frame unit is provided with a through unit to form a flow path, a rotor having a magnetic force is movably placed between the frames of the frame unit to selectively open and close the flow path of the through unit and a coil unit is placed in the frame unit to control the rotor having the magnetic force, thus being automatically opened and closed in response to a wireless or wired electrical signal differently from an existing contact-type apparatus, so that the electromagnetic apparatus is advantageous in that the size and manufacturing costs of the apparatus can be reduced due to the simple structure and easy manufacture of the apparatus, the leakage of fluid occurring due to the insufficient manipulation or wear of a lever can be prevented, risks are moved by automatic supply and shutoff using the external electrical signal to maximize safety, power consumption is minimized because power is applied only when the external electrical signal is applied, and the convenience of use is provided because the electromagnetic apparatus of the present invention is remotely controlled in a wireless or wired manner when the electromagnetic apparatus is electrically connected to a control unit to be operated by the external electrical signal.

2. Description of the Related Art

A conventional manual apparatus for selectively supplying and shutting off fluid is configured to be selectively opened and closed by the manipulation of a lever projected from the pipe or housing, so that the conventional manual apparatus cannot be contained in a flow path, thus complicating the structure of the apparatus and, thereby, increasing the size and costs of the apparatus. Since the conventional manual apparatus is equipped with a contact-type manual lever, the leakage of fluid may occur due to the insufficient manipulation or wear of the manual lever.

The conventional manual apparatus is disadvantageous in that fluid cannot be automatically shut off at the same time that a leakage alarm is raised because the conventional manual apparatus is installed indoors, differently from the electromagnetic apparatus of the present invention that can be installed outdoors when a fluid safety system is equipped therewith. The conventional manual apparatus is disadvantageous in that it is inconvenient. Furthermore, the conventional manual apparatus is problematic in that fluid cannot be safely supplied because a rotor cannot be moved to a shutoff position and cannot realize shutoff due to an excessive flow when the excessive flow is generated by causes, such as the cutting of the piping.

Meanwhile, there is an example in which in a conventional electromagnetic apparatus for selectively supplying and shutting off fluid, a lever is projected from the piping or a housing and is selectively turned on and off by a motor or solenoid. Such a conventional electromagnetic apparatus has a complicated structure, requires high costs and has high energy consumption, and, thus, is not widely used currently.

Accordingly, the conventional apparatuses for selectively supplying and shutting off fluid have the problems of stability, efficiency and reliability.

SUMMARY OF THE INVENTION

Accordingly, the present invention has been made keeping in mind the above problems occurring in the prior art, and objects of the present invention are as follows:

An object of the present invention is to provide a device for selectively supplying and shutting off fluid, which is installed in a pipe or housing supplying gas or liquid and automatically shuts off fluid in response to an external electrical signal, so that the size of the device can be reduced, the manufacture of the device can be facilitated and the costs of the device can be decreased.

Another object of the present invention is to provide an electromagnetic apparatus, which is capable of eliminating a risk by automatically shutting off fluid in response to an external electrical signal to prevent the leakage of fluid so as to prevent the leakage of fluid attributable to the insufficient manipulation or wear of a lever that may occur in the conventional apparatus equipped with a manual lever projected to the outside of the conventional apparatus.

Another object of the present invention is to provide an electromagnetic apparatus, in which a rotor automatically performs a shutoff operation and shuts off fluid to overcome the problem in which a shutoff operation was not performed in the conventional apparatus when an excessive flow is generated due to various causes, such as the cutting of the piping.

Another object of the present invention is to provide an electromagnetic apparatus, which is capable of maximizing power consumption by applying power only when the supply and shutoff of fluid is performed in response to external electrical signals.

Another object of the present invention is to provide an electromagnetic apparatus, which is electrically connected to a control unit to be selectively opened and closed, so that the electromagnetic apparatus is remotely controlled in a wireless or wired manner, thus increasing the convenience of use.

In order to accomplish the above object, the present invention provides an electromagnetic apparatus for automatically and selectively supplying and shutting off fluid, including a frame unit coaxially contained in the piping or a housing forming the flow path of a fluid; a through unit having one or more through holes to form one or more flow paths through the frame unit; a coil unit placed in the frame unit to generate an electromagnetic force; a rotor facing the frame unit to selectively open and close the flow paths through interaction with the electromagnetic force generated in the coil unit; a shaft supporting the rotor; and a casing supporting the frame unit and forming the appearance of the apparatus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
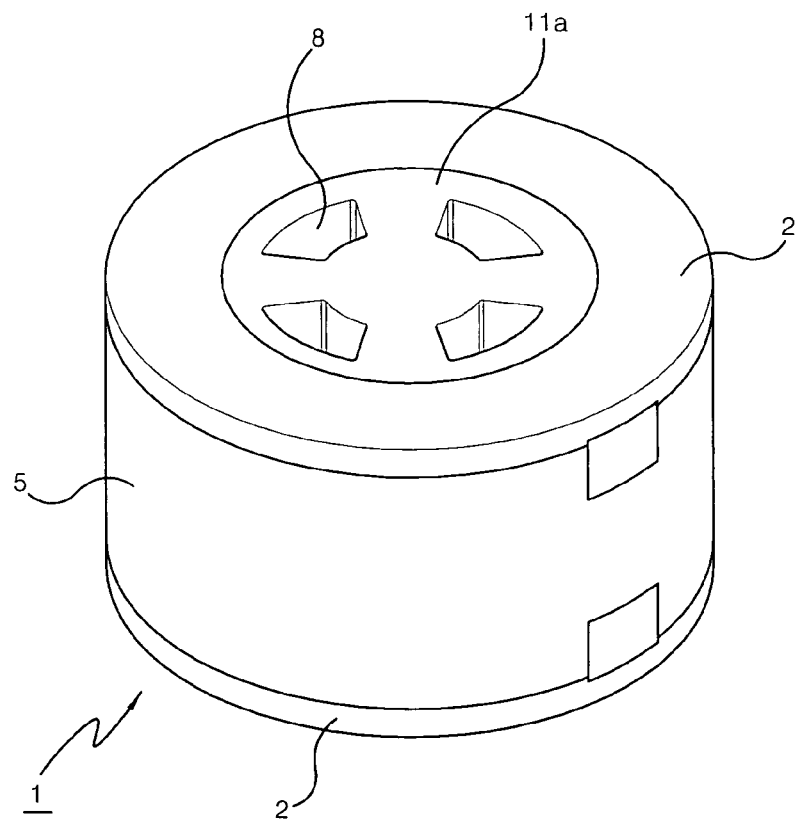
FIG. 1 is a perspective view showing the appearance of an electromagnetic apparatus for automatically and selectively supplying and shutting off fluid in accordance with the present invention.

Reference now should be made to the drawings, in which the same reference numerals are used throughout the different drawings to designate the same or similar components.

In the following description of the present invention, if detailed descriptions of well-known constructions and functions obscure the gist of the present invention, the detailed descriptions will be omitted.

The terms in the following description are selected in view of the functions of corresponding elements in the present invention. Since they may vary according to the intention and convention of manufacturers, the definitions of them must be made based on the entire contents of the present specification.

Figure 2:
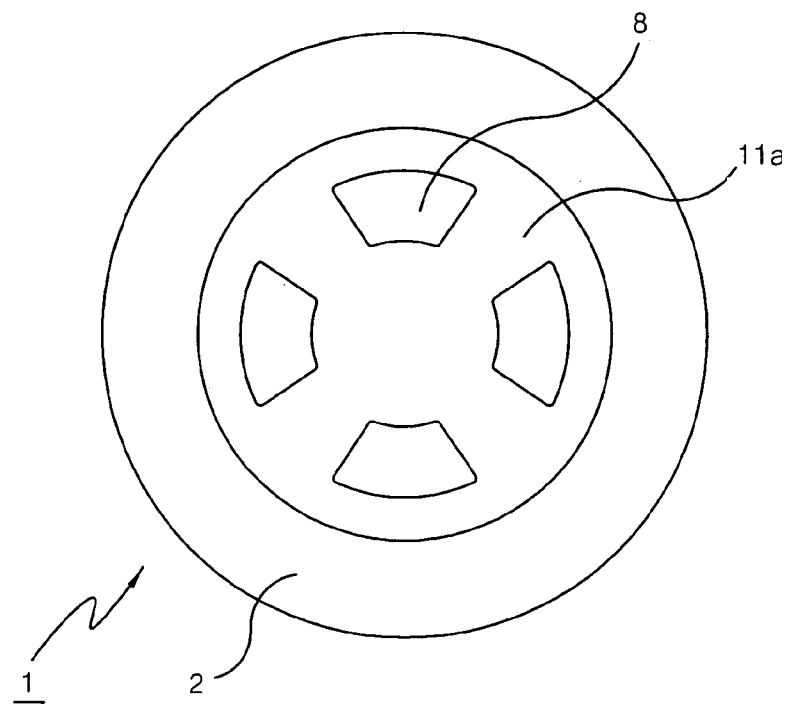
FIG. 2 is a plan view showing the through unit of the electromagnetic apparatus of the present invention.
Figure 3:
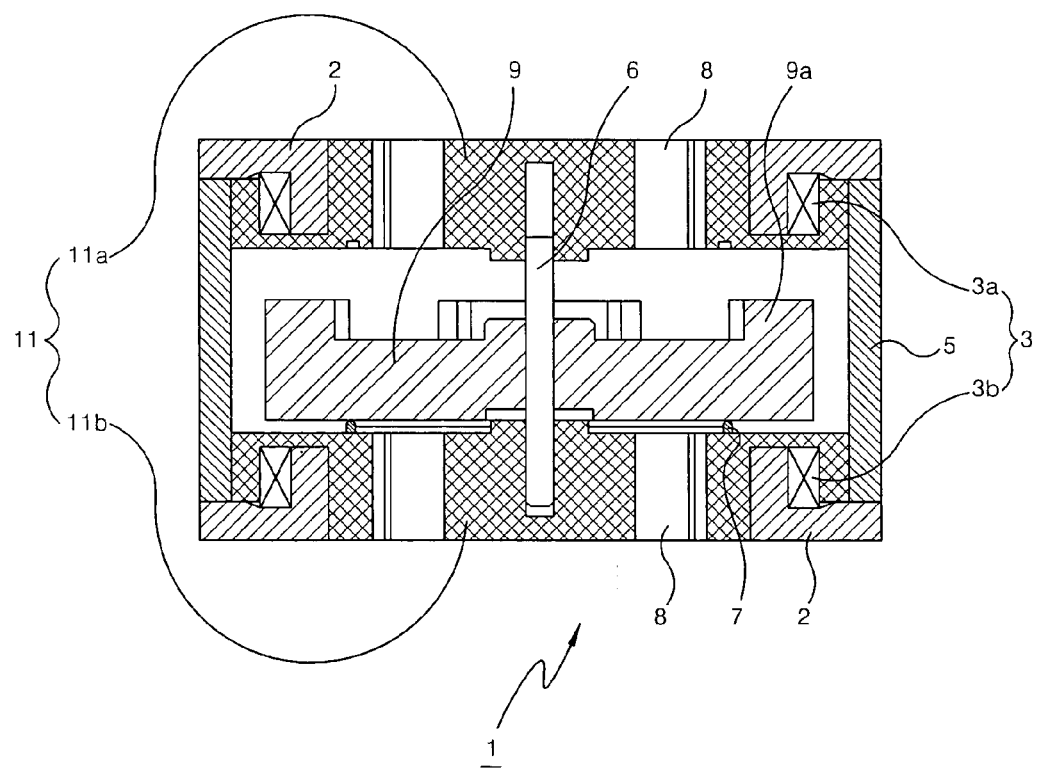
FIG. 3 is a cross-section showing the electromagnetic apparatus of the present invention in a shutoff position.
Figure 4:
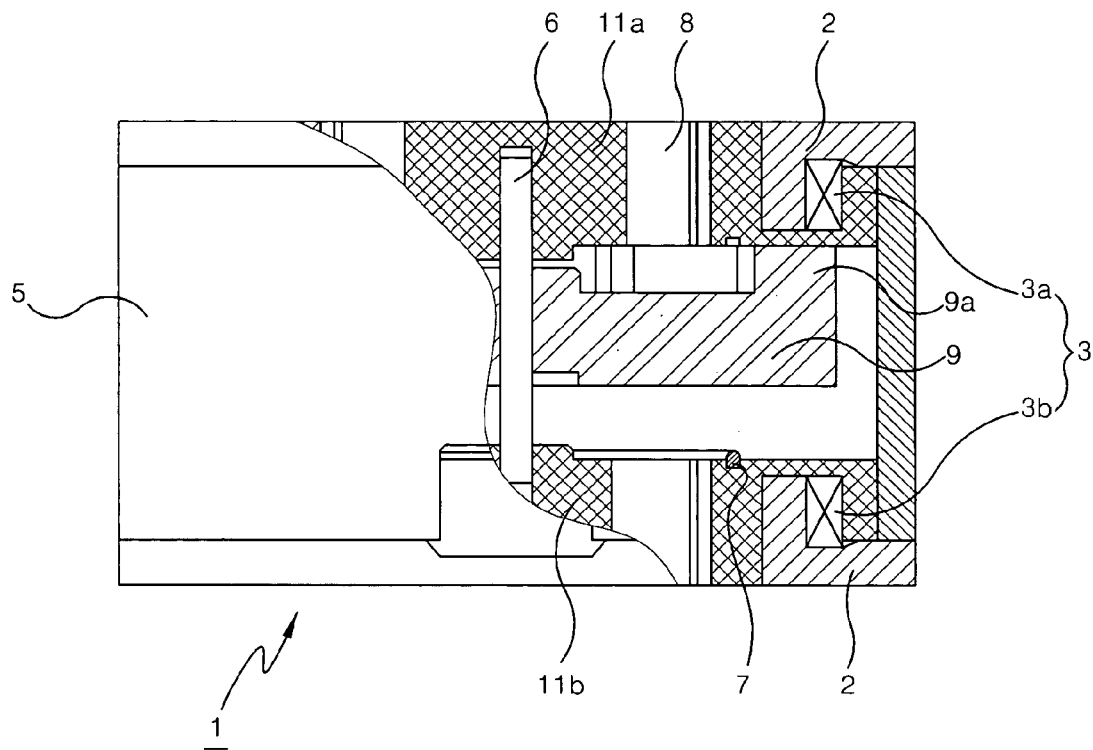
FIG. 4 is a partially exploded cross-section showing the electromagnetic apparatus of the present invention in a supply position.
Figure 5:
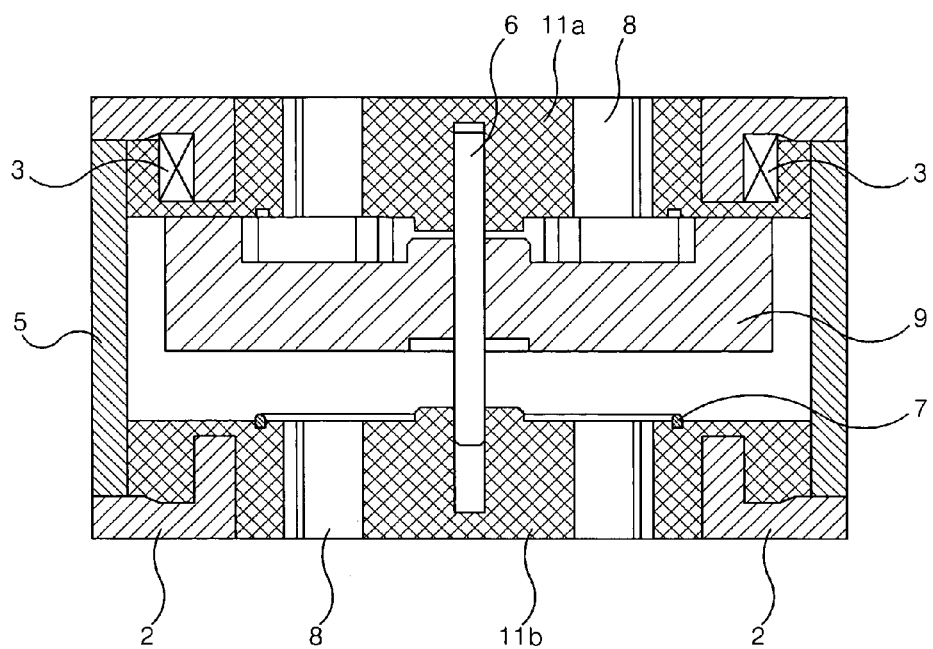
FIG. 5 is a cross-section showing an electromagnetic apparatus for automatically and selectively supplying and shutting off fluid in accordance with another embodiment of the present invention.
Figure 6:
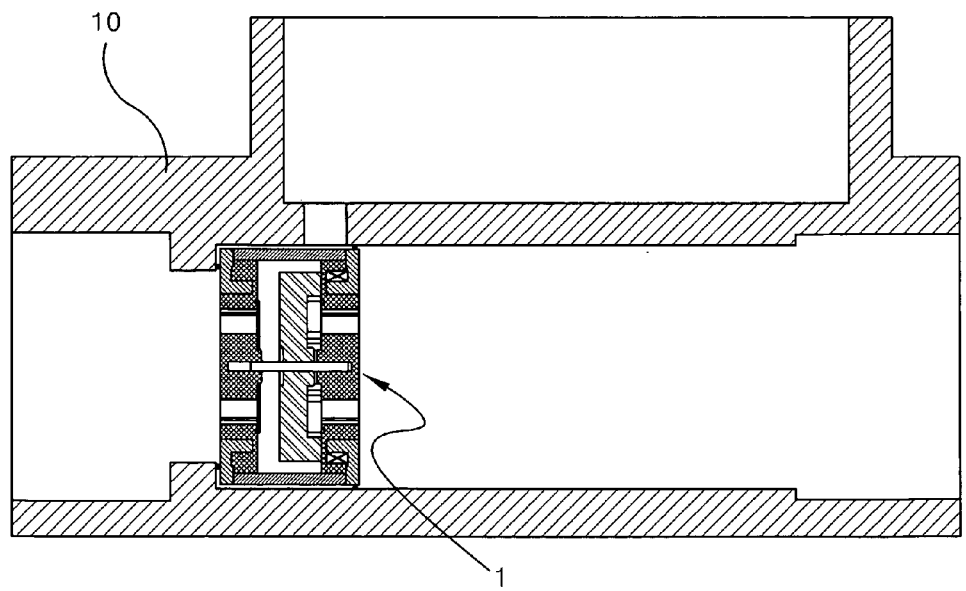
FIG. 6 is a cross-section of a housing in which the electromagnetic apparatus of the present invention is contained.
Figure 7:
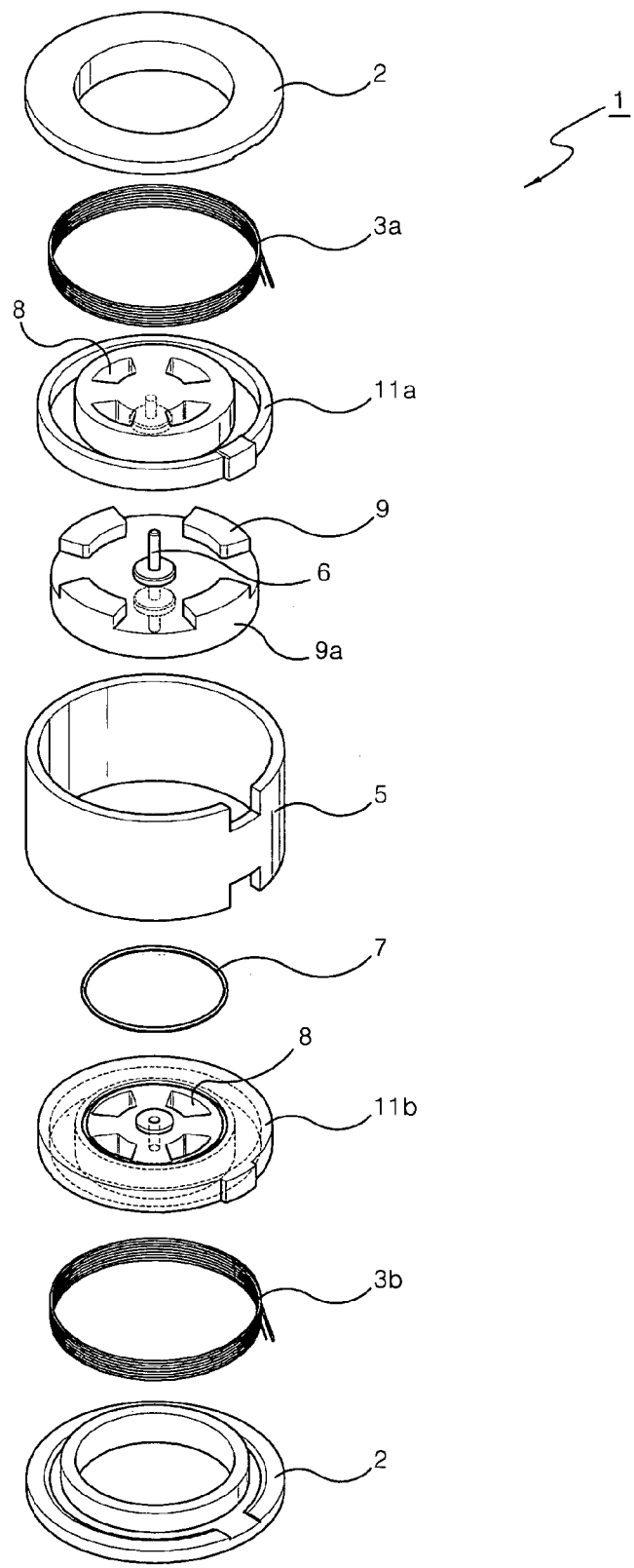
FIG. 7 is an exploded perspective view of the electromagnetic apparatus of the present invention.

The present invention is described with reference to the accompanying drawings. FIG. 1 is a perspective view showing the appearance of an electromagnetic apparatus for automatically and selectively supplying and shutting off fluid in accordance with the present invention. FIG. 2 is a plan view showing the through unit of the electromagnetic apparatus of the present invention. FIG. 3 is a cross-section showing the electromagnetic apparatus of the present invention in a shutoff position. FIG. 4 is a partially exploded cross-section showing the electromagnetic apparatus of the present invention in a supply position. FIG. 5 is a cross-section showing an electromagnetic apparatus for automatically and selectively supplying and shutting off fluid in accordance with another embodiment of the present invention. FIG. 6 is a cross-section of a housing in which the electromagnetic apparatus of the present invention is contained. FIG. 7 is an exploded perspective view of the electromagnetic apparatus of the present invention.

An electromagnetic apparatus 1 for automatically and selectively supplying and shutting off fluid includes a frame unit 11 coaxially contained in the piping or a housing forming the flow path of a fluid, a through unit 8 having one or more through holes to form one or more flow paths through the frame unit 11, a coil unit 3 placed in the frame unit 11 to generate an electromagnetic force, a rotor 9 facing the frame unit 11 to selectively open and close the flow paths through interaction with the electromagnetic force generated in the coil unit 3, a shaft 6 supporting the rotor 9, and a casing 5 supporting the frame unit 11 and, thus, forming the appearance of the apparatus.

The frame unit 11 comprise upper and lower frames 11a and 11b placed in upper and lower portions of the electromagnetic apparatus, respectively, and the coil unit 3 comprises coils 3a and 3b that are placed in the upper and lower frames 11a and 11b, respectively, and are connected in series to each other so that an attractive force and a repulsive force are simultaneously generated and applied to the rotor 9.

The frame unit 11 is provided with a coil 3a or 3b so that the rotor 9 is opened or closed by an attractive force or a repulsive force.

The frame unit 11 is provided with a core unit 2 so that a magnetic path of the electromagnetic force generated in the coil unit 3 is formed and the rotor 9 performs a holding operation after the cutoff of power.

The frame unit 11 is integrally made of resin so that durability is improved and an entire portion of the frame unit 11 except for the flow paths is closed.

The frame unit 11 is provided with one or more flat or circular projections or sealing members at the top surface of the frame unit 11, which makes contact with one surface of the rotor 9, to prevent the leakage of fluid at the time of shutoff.

The frame unit 11 is provided with shaft guide holes at the centers thereof so that a shaft is supported to be rotated by the shaft guide holes.

The rotor 9 is provided with protrusions 9a on one surface of the rotor 9 to allow higher and lower portions to exist in the same circle and, thus, form flow paths, and one or more flat or circular projections or sealing members on the other surface of the rotor 9, which makes contact with the frame unit, to prevent the leakage of fluid at the time of shutoff.

The electromagnetic apparatus 1 for automatically and selectively supplying and shutting off fluid constructed as described above includes the frame 11, the rotor 9, and the casing 5 supporting the frame 11. The frame unit 11 includes the upper and lower frames 11a and 11b. The frame unit 11 is constructed to include the through unit 8 having one or more through holes, the coil unit 3 to be supplied with power and generate an electromagnetic force, the core unit 2 supporting coils and forming a magnetic path, and the shaft guide holes receiving a shaft 6 to rotatably support the rotor 9. The frame unit 11 is integrally made of resin to implement sealing so as to increase durability and prevent sparks from being generated at the time of a short circuit.

The rotor 9 is integrally formed of a plastic magnet to have a magnetic force. The shaft 6 is insert-injected or tightly fitted into the center of the rotor 9 to allow the rotor 9 to be rotated. One or more protrusions 9a are formed on the top surface of the rotor 9 to allow the rotor 9 to have higher and lower portions so that one or more flow paths are formed at the time of supplying fluid. One or more flat or circular projections or sealing members 7 are formed on the bottom surface of the rotor 9, which makes contact with one of the frame unit 11, to shut off fluid during a shutoff operation.

Furthermore, one or more flat or circular projections or sealing members 7 are formed on the top surface of the lower frame 11b of the frame unit 11, which comes into contact with the rotor, to prevent the leakage of fluid at the time of shutting off fluid. The casing 5 is placed between the upper and lower frames 11a and 11b to form a cylindrical shape. The cylindrical shape not only forms a magnetic path but also functions to protect components from an external force.

The electromagnetic apparatus 1 for automatically and selectively supplying and shutting off fluid may be installed in piping to allow the electromagnetic apparatus 1 to be directly installed in a flow path., or may be installed in such a way that a housing 10 is separately provided, the electromagnetic apparatus 1 is mounted in the housing 10 and the housing 10 with the apparatus 1 mounted therein is connected to the piping.

As described above, to install the electromagnetic apparatus 1 in the piping or housing 10, the through unit 8 must be provided to allow fluid to pass through the frame unit 11, and the piping and the frame unit 11 must be sealed from the outside of the electromagnetic apparatus 1 by the sealing member 7, such as sealing material or silicon.

The reason for this is that only the flow paths formed by the through unit 8 of the frame unit 11 can be controlled, and the through unit 8 defining the flow paths through the frame unit 11 is preferably configured so that the number and sizes of through holes are designed in view of the hydraulic pressure and amount of fluid.

Meanwhile, the coil unit 3 is preferably formed of a single ring-shaped coil, and functions to generate an electromagnetic force using power applied from the outside of the electromagnetic apparatus 1 and, thereby, form an attractive force or a repulsive force with respect to the rotor 9, thus functioning to control the supplying and shutting off of fluid. In a dual frame structure having both the upper frame 11a and the lower frame 11b, when the rear end of an upper coil 3a is connected to the front end of a lower coil 3b and the front end of the upper coil 3a and the rear end of the lower coil 3b are connected to an external power source, an attractive force and a repulsive force are simultaneously generated with respect to the rotor 9 at the time of supplying and shutting off fluid, so that accurate operations can be performed.

That is, when an attractive force is generated between the upper frame 11a and the top surface of the rotor 9, a repulsive force is generated between the lower frame 11b and the bottom surface of the rotor 9, so that accurate supplying and shutting-off operations can be performed.

In the meantime, a method of supplying power from the frame unit 11 to the coil unit 3 may be implemented by providing a printed circuit board in the upper portion of the inside of the core unit 2 and connecting the printed circuit board to an external power source using a lead wire or a flexible base board.

The core unit 2 placed inside the coil unit 3 is preferably bent inwardly at the inner periphery thereof. The reason for this is to bring the core unit 2 into direct contact with the casing 5 to form the magnetic path of a magnetic flux generated in the coil unit 3.

Meanwhile, when an air gap between the core unit 2 and the casing 5 is large, magnetic resistance is increased and, thus, an attractive force or a repulsive force is weakened, and when power supplied to the coil unit 3 is cut off, the core unit 2 functions to maintain the rotor 9 at the position where the rotor 9 was located before the power is cut off. The electromagnetic apparatus of the present invention can reduce power consumption compared to a conventional apparatus in which the operation thereof can be maintained only when power is continuously supplied. In brief, power is applied only at the time of supplying and shutting off fluid, so that the efficiency of the electromagnetic apparatus 1 can be improved.

Another function of the core unit 2 is to support the coil unit 3 and prevent the coil unit 3 from being deformed when the frame unit 11 is integrally formed of resin to seal the coil unit 3 and the core unit 2. This core unit 2 functions to prevent the coil unit 3 from being cut and reinforce the inside of the frame unit 11, thus improving the durability of the electromagnetic apparatus 1.

The shaft guide hole is provided at the center of the frame unit 11 to hold the shaft 6. The shaft guide hole may be designed to be suitable for a shaft fixing structure or shaft rotating structure. In view of the manufacture of the electromagnetic apparatus 1 of the present invention, the shaft rotating structure is preferable.

The rotor 9 for actually supplying and shutting-off fluid is preferably formed of a permanent magnet. In the electromagnetic apparatus 1 used at high hydraulic pressure, the rotor 9 is preferably formed of an NdFeB magnet having a high magnetic force. In contrast, in the electromagnetic apparatus 1 used at low hydraulic pressure, the rotor 9 is formed of a plastic magnet.

When the magnetic force of the rotor 9 is excessively large, the control of supplying and shutting-off operations is effectively carried out but it is difficult to implement the automatically shutoff of an excessive flow. Accordingly, it is preferable to determine the material of magnet of the rotor 9 and a method of manufacturing the rotor 9 depending on hydraulic pressure.

That is, if an excessive flow occurs while the core unit 2 and the rotor 9 are held by the attractive force thereof, the excessive flow cannot be shut off if the attractive force between the core unit 2 and the rotor 9 is larger than an increased hydraulic force, and fluid is shut off even by an external force or the weak variation of a hydraulic force if the attractive force between the core unit 2 and the rotor 9 is smaller than an increased hydraulic force.

One or more protrusions 9a are formed on one surface of the rotor 9 to allow lower portions and higher portions to exist in the same circle, so that flow paths formed by the through unit 8 formed through the frame unit 11 continue. It is preferable that the widths and heights of the lower portion and the higher portion are designed in view of the hydraulic. pressure and amount of fluid.

One or more flat or circular projections or sealing members are formed on the other surface of the rotor 9 that makes contact with the frame unit 11 so that fluid is prevented from leaking at the time of shutting off the fluid. A lower surface portion may be formed on a part of the other surface of the rotor 9 to realize holding balance between the protrusion 9a and the upper frame 11a.

Meanwhile, the rotor 9 is supported and rotated by the shaft 6 provided at the center of the rotor 9. The outer diameter of the rotor 9 is preferably designed in view of the through unit 8 of the frame unit 11 and the bottom surface of the rotor 9.

At the time of supplying fluid, the fluid flows into the electromagnetic apparatus 1 through the through unit 8 of the frame unit 11, a flow path is formed along the bottom surface of the rotor 9, the fluid flows to the through unit 8 of the lower frame 11b through a flow path between the casing 5 and the rotor 9. In contrast, at the time of shutting off fluid, the flow path is closed by the sealing member 7, such as silicon, placed on the bottom surface of the rotor 9 or the top surface of the lower frame 11b.

As shown in FIG. 5, in another embodiment of the present invention, a coil 3 is provided only in the upper frame 11a and the coil 3 is connected to an external power source, so that only an attractive force or a repulsive force with respect to the rotor 9 is generated, thus controlling the supplying and shutting-of operations of the electromagnetic apparatus.

That is, when '+' electricity is applied to the coil 3, an attractive force with respect to the rotor 9 is generated, thus supplying fluid. In contrast, when '−' electricity is applied to the coil 3, a repulsive force is generated, so that the rotor 9 is moved to a shutoff position. Even though the coil 3 is eliminated from the lower frame 11b when the hydraulic pressure and amount of fluid is small, there is no problem about the supplying and shutting-off of fluid.

As described above, in the electromagnetic apparatus for automatically and selectively supplying and shutting off fluid, a frame unit is installed in the piping or a housing supplying fluid to be in direct contact with the fluid, the frame unit is provided with a through unit to form a flow path, a rotor having a magnetic force is movably placed between the frames of the frame unit to selectively open and close the flow path of the through unit of the frame unit and a coil unit is placed in the frame unit to control the rotor having the magnetic force, so that the electromagnetic apparatus of the present invention is automatically and selectively opened and closed in response to a wireless or wired electrical signal, differently from existing contact-type apparatus. As a result, the electromagnetic apparatus of the present invention is advantageous in that the size and manufacturing costs of the apparatus can be reduced due to the simple structure and easy manufacture of the apparatus, the leakage of fluid occurring due to the insufficient manipulation or wear of a lever can be prevented, risks are removed by automatic supply and shutoff using the external electrical signal to maximize safety, power consumption is minimized because power is applied only when the external electrical signal is applied, and the convenience of use is provided because the electromagnetic apparatus of the present invention is remotely controlled in a wireless or wired manner when the electromagnetic apparatus is electrically connected to a control unit to be operated by the external electrical signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electromagnetic apparatus for automatically and selectively supplying and shutting off fluid, comprising:
   a frame unit coaxially contained in piping or a housing forming the flow path of a fluid;
   a through unit having at least one through hole to form at least one flow path through said frame unit;
   a coil unit disposed in said frame unit to generate an electromagnetic force;
   a rotor facing said frame unit to selectively open and close the flow paths through interaction with said electromagnetic force generated in said coil unit;
   a shaft supporting said rotor; and
   a casing supporting said frame unit and forming an appearance of said apparatus,
   said electromagnetic apparatus comprises upper and lower portions,
   said frame unit comprises upper and lower frames disposed in said upper and lower portions of said electromagnetic apparatus, respectively, and
   said coil unit comprises coils that are disposed in said upper and lower frames, respectively, and are connected in serial to each other so that an attractive force and a repulsive force are simultaneously generated and applied to said rotor.

2. The electromagnetic apparatus according to claim 1, wherein said frame unit is provided with a core unit so that a magnetic path of said electromagnetic force generated in said coil unit is formed and said rotor performs a holding operation after cutoff of power.

3. The electromagnetic apparatus according to claim 1, wherein said frame unit is integrally made of resin.

4. The electromagnetic apparatus according to claim 1, wherein said frame unit is provided with one or more flat or circular projections or sealing members at a top surface of said frame unit, which makes contact with one surface of said rotor, to prevent leakage of fluid at a time of shutoff.

5. The electromagnetic apparatus according to claim 1, wherein said frame unit is provided with shaft guide holes at centers thereof so that a shaft is supported to be rotated by said shaft guide holes.

6. The electromagnetic apparatus according to claim 1, wherein said rotor is provided with protrusions on a first surface of said rotor to allow higher and lower portions to exist in a same circle and, thus, form flow paths, and one or more flat or circular projections or sealing members on a second surface of said rotor, which makes contact with said frame unit, to prevent leakage of fluid at a time of shutoff.

7. The electromagnetic apparatus according to claim 1, wherein said frame unit is provided with a coil so that said rotor is opened or closed by an attractive force or a repulsive force.

8. An electromagnetic apparatus for automatically and selectively supplying and shutting off fluid, comprises:
   a frame unit coaxially contained in piping or a housing forming the flow path of a fluid;
   a through unit having at least one through hole to form at least one flow path through said frame unit;
   a coil unit disposed in said frame unit to generate an electromagnetic force;
   a rotor facing said frame unit to selectively open and close the flow paths through interaction with said electromagnetic force generated in said coil unit;
   a shaft supporting said rotor; and
   a casing supporting said frame unit and forming an appearance of said apparatus;
   wherein said frame unit is provided with one or more flat or circular projections or sealing members at a top surface of said frame unit, which makes contact with one surface of said rotor, to prevent leakage of fluid at a time of shutoff.

9. An electromagnetic apparatus according to claim 8, wherein:
   said electromagnetic apparatus comprises upper and lower portions;
   said frame unit comprises upper and lower frames placed in said upper and lower portions of said electromagnetic apparatus, respectively; and
   said coil unit comprises coils that are disposed in said upper and lower frames, respectively, and are connected in serial to each other so that an attractive force and a repulsive force are simultaneously generated and applied to said rotor.

10. An electromagnetic apparatus according to claim 8, wherein said frame unit is provided with a core unit so that a magnetic path of said electromagnetic force generated in said coil unit is formed and said rotor performs a holding operation after cutoff of power.

11. An electromagnetic apparatus according to claim 8, wherein said frame unit is integrally made of resin.

12. An electromagnetic apparatus according to claim 8, wherein said frame unit is provided with shaft guide holes at centers thereof so that a shaft is supported to be rotated by said shaft guide holes.

13. An electromagnetic apparatus according to claim 8, wherein said rotor is provided with protrusions on a first surface of said rotor to allow higher and lower portions to exist in a same circle and, thus, form flow paths, and one or more flat or circular projections or sealing members on a second surface of said rotor, which makes contact with said frame unit, to prevent leakage of fluid at a time of shutoff.

14. An electromagnetic apparatus according to claim 8, wherein said frame unit is provided with a coil so that said rotor is opened or closed by an attractive force or a repulsive force.

15. An electromagnetic apparatus for automatically and selectively supplying and shutting off fluid, comprises:
- a frame unit coaxially contained in piping or a housing forming the flow path of a fluid;
- a through unit having at least one through hole to form at least one flow path through said frame unit;
- a coil unit disposed in said frame unit to generate an electromagnetic force;
- a rotor facing said frame unit to selectively open and close said flow paths through interaction with said electromagnetic force generated in said coil unit,
- a shaft supporting said rotor;
- a casing supporting said frame unit and forming an appearance of said apparatus; and
- said rotor is provided with protrusions on a first surface of said rotor to allow higher and lower portions to exist in a same circle and, thus, form flow paths, and one or more flat or circular projections or sealing members on a second surface of said rotor, which makes contact with said frame unit, to prevent leakage of fluid at a time of shutoff.

16. An electromagnetic apparatus according to claim 15, wherein:
- said electromagnetic apparatus comprises upper and lower portions;
- said frame unit comprises upper and lower frames disposed in said upper and lower portions of said electromagnetic apparatus respectively; and
- said coil unit comprises coils that are disposed in said upper and lower frames, respectively, and are connected in serial to each other so that an attractive force and a repulsive force are simultaneously generated and applied to said rotor.

17. An electromagnetic apparatus according to claim 15, wherein said frame unit is integrally made of resin.

18. An electromagnetic apparatus according to claim 15, wherein said frame unit is provided with one or more flat or circular projections or sealing members at a top surface of said frame unit, which makes contact with one surface of said rotor, to prevent leakage of fluid at a time of shutoff.

19. An electromagnetic apparatus according to claim 15, wherein said frame unit is provided with shaft guide holes at centers thereof so that a shaft is supported to be rotated by said shaft guide holes.

20. An electromagnetic apparatus according to claim 15, wherein said frame unit is provided with a coil so that said rotor is opened or closed by an attractive force or a repulsive force.

* * * * *